July 13, 1926. 1,592,430
R. R. LA BELLE
FOUNTAIN SPONGE
Filed Oct. 27, 1924
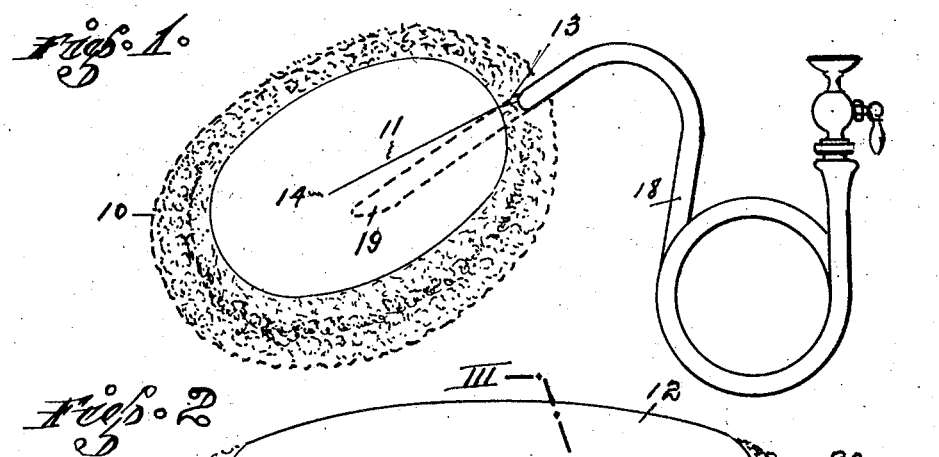
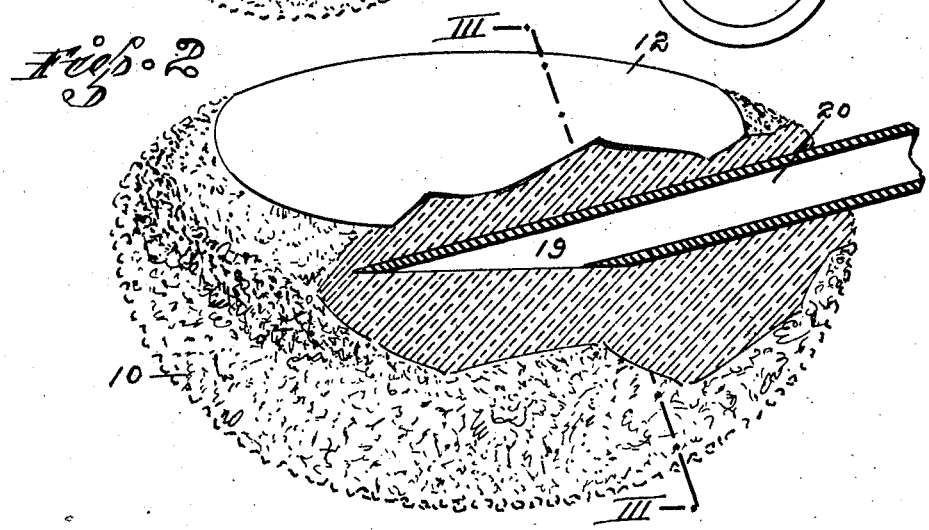
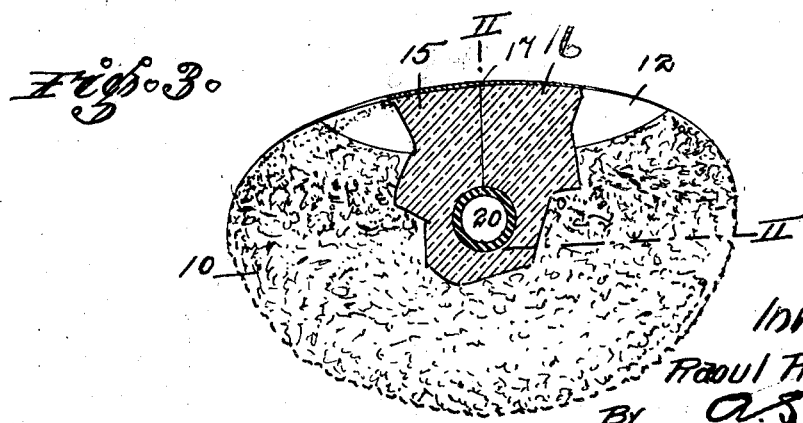
Inventor
Raoul R. La Belle
By A. S. Papé
Attorney Patented July 13, 1926.

1,592,430

UNITED STATES PATENT OFFICE.

RAOUL R. LA BELLE, OF OAKLAND, CALIFORNIA.

FOUNTAIN SPONGE.

Application filed October 27, 1924. Serial No. 746,016.

This invention relates to fountain sponges constructed of resilient material such as soft rubber tubing and composition sponge material.

The invention comprises a sponge body portion of rubber composition provided with a section of rubber tubing centered therein by means of a longitudinal slit extending from the outer surface to the center thereof, whereby the tubing may be securely held in place by means of vulcanization or any well known rubber cement. This may be accomplished by slitting the sponge vertically and inserting a piece of soft rubber or other material in the slit to form inlet from the water supply.

The sponge body portion is securely lapped about the tubing and vulcanized or cemented or otherwise secured in place and forms an integral part therewith. The body portion of sponge may be vulcanized to the tubing by a well known process which will cause the wall of the tubing to adhere to the body and form a central opening into the sponge through which water is circulated from the hose connection.

One of the objects of this invention is to provide a fountain sponge which is extremely simple in construction and that may be manufactured with stock material or scrap.

Another object is to provide a sponge of this character which may be easily connected to any source of supply and used to advantage on an automobile, for washing windows or for the bath or wherever the same may be applicable.

Another object is to construct a sponge of soft texture which is adapted to scrubbing purposes by virtue of its uniform resiliency and ease of manipulation.

Other objects and advantages will appear with reference to the subjoined specification and the accompanying one sheet of drawing, in which:

Figure 1 is a perspective view illustrating my fountain sponge in position for use and showing the tubing connected to a supply such as a bath tap.

Figure 2 is a horizontal fragmentary section through the body portion and tubing taken at line II—II of Fig. 3.

Figure 3 is a transverse section taken at line 3—3 of Fig. 2.

Referring more particularly to the drawings (10) comprises the body portion which may be of any sponge material of convenient size, such as a rubber composition sponge.

In the manufacture of this invention the sponge body portion (10) is split from one face (11) inwardly to the center. This split being formed from one end (13) to near the middle of the body (10), thereby forming halved sections (15) and (16) parted at the line (17) see Fig. 3.

A section of soft rubber tubing (18) of any desired length is cut off obliquely and inserted into the split (17) of the body portion, and the halved sections (15) and (16) are brought snugly over the section (20) of the tubing and vulcanized or otherwise secured to it and together at the parting line (17).

The tubing (20) being cut obliquely as shown at (19) constitutes a free discharge orifice communicating with the sponge body portion (10) so that the water from the tube to said sponge body may run freely therein. I have shown a tube (20) of soft rubber or like material preferably secured within the body portion (10) at an acute angle to facilitate the exudation of the water therein. This flexible tube (20) provides a resilient reinforcement for the body portion and at the same time does not interfere with the resilient sponginess of the body portion, while adding to its resistance to tearing apart in rough usage. This tube is vulcanized or cemented in after insertion. To avoid cutting the sponge (10) as at (11), a sharp bodkin or knife may be inserted into the sponge to form a self closing opening to receive the tube section (20), that is coated with cement before insertion.

In forming sponge rubber it comes from the mold with a thin impervious coating or skin. This is taken advantage of in fabricating this invention. It is the practice to shear off this skin to expose the porous portion (10). Enough of the skin is left on top to form the impervious pad (12), which prevents water flowing out of the sponge in an upward direction beneath the hand of the user where it would serve no useful purpose. This feature is essential to the invention, as it contributes to its efficiency, the comfort of the user adds strength to the body portion (10) and provide means for holding the sponge in practice and squeeze the liquid therefrom.

Having thus described my invention, and an embodiment of it, in the full, clear and exact terms required by law, and believing that it comprises novel, useful and valuable improvements in the art to which it pertains, I here state that I do not wish to be limited to the precise construction and arrangement of the several parts, as herein set forth, but reserve the right to such modifications as do not depart from the scope of my invention as defined in the appended claims.

What I claim and desire to secure by Letters Patent of the United States, is the following to wit:—

1. A fountain washer comprising a sponge, a tube extending obliquely into and fixed in said sponge, an impervious sheet secured to the top of said sponge, said tube being provided with an oblique outlet orifice to permit a free discharge within said sponge.

2. A fountain sponge comprising a body of rubber sponge, said body being slitted from one outer surface to the center thereof, a rubber tube inserted within the slit and vulcanized to the body, the inner end of said tube being cut off obliquely to permit ready discharge within the body.

In testimony that I claim the foregoing I have hereto set my hand this 21st day of October, 1924.

RAOUL R. LA BELLE.